(12) United States Patent
Franz et al.

(10) Patent No.: US 7,377,444 B2
(45) Date of Patent: May 27, 2008

(54) DATA CARRIER

(75) Inventors: Peter Franz, Pienzenau (DE);
Ruediger Schmidt, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 192 days.

(21) Appl. No.: 10/524,059

(22) PCT Filed: Aug. 1, 2003

(86) PCT No.: PCT/EP03/08544

§ 371 (c)(1),
(2), (4) Date: Feb. 8, 2005

(87) PCT Pub. No.: WO2004/020217

PCT Pub. Date: Mar. 11, 2004

(65) Prior Publication Data

US 2006/0163361 A1    Jul. 27, 2006

(30) Foreign Application Priority Data

Aug. 9, 2002   (DE) ................................ 102 37 059

(51) Int. Cl.
*G06K 19/00*    (2006.01)

(52) U.S. Cl. ...................................... 235/487; 235/494
(58) Field of Classification Search ................ 235/487, 235/494, 462.01, 462.03
See application file for complete search history.

(56) References Cited

U.S. PATENT DOCUMENTS

| 5,772,249 A | 6/1998 | Guex et al. |
| 6,396,927 B1 | 5/2002 | Phillips |
| 6,417,968 B1 * | 7/2002 | Staub et al. ................ 359/567 |

FOREIGN PATENT DOCUMENTS

| EP | 0 353 974 | 2/1990 |
| WO | WO 99/38038 | 7/1999 |

* cited by examiner

*Primary Examiner*—Daniel St.Cyr
(74) *Attorney, Agent, or Firm*—Rothwell, Figg, Ernst & Manbeck P.C.

(57) ABSTRACT

A halftone image original is converted into a line screen halftone image including regularly spaced-apart screen lines 5 that are modulated in their width y in accordance with the tonal value to be represented. According to the invention, width y of screen lines 5 is modulated only on one side so that screen lines 5 are flat on one side and width-modulated on one side. Various examples are stated for how this screen line modulation permits effective copy protection.

24 Claims, 9 Drawing Sheets

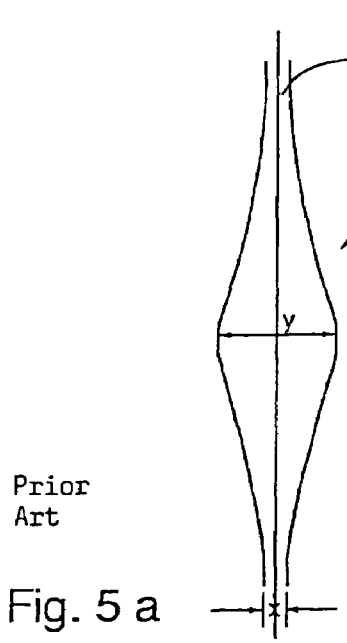
Prior Art
Fig. 5 a
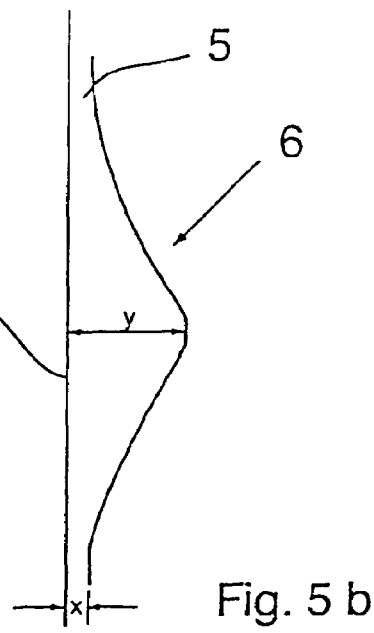
Fig. 5 b
Fig. 6 a
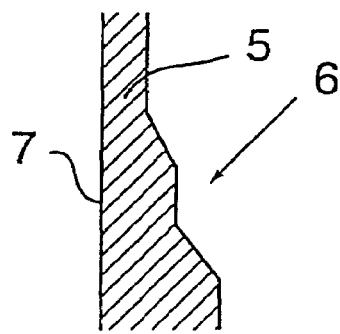
Fig. 6 b
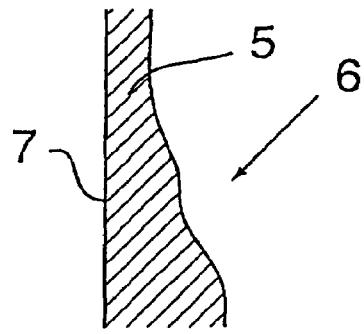
Fig. 6 c
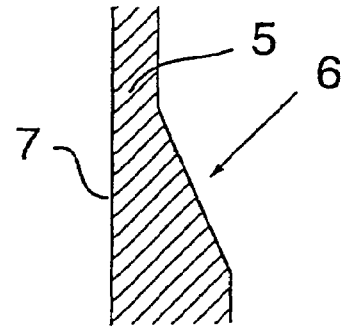
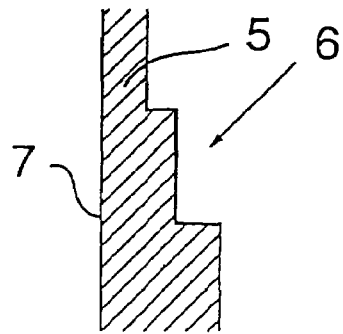
Fig. 6 d
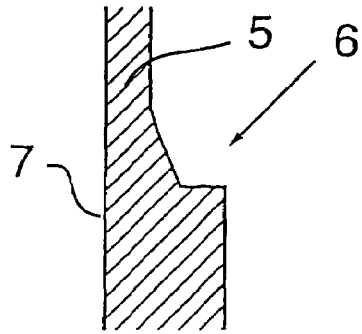
Fig. 6 e
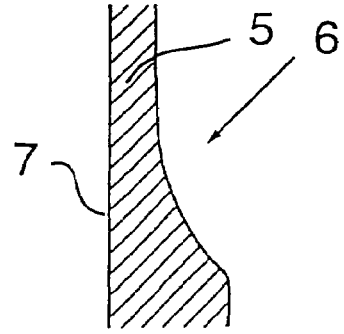
Fig. 6 f

DATA CARRIER

CROSS-REFERENCE TO RELATED APPLICATION

This application is a National Phase of International Application Serial No. PCT/EP03/08544, filed Aug. 1, 2003.

FIELD OF THE INVENTION

This invention relates to a data carrier, in particular a document of value such as a bank note, check, share, identification document, admission ticket, travel ticket, certificate, credit card, check card and the like, having a halftone image represented by spaced, linear structural elements.

DESCRIPTION OF THE BACKGROUND ART

The structural elements form a regular line screen. Each structural element usually has a center line with respect to which the width of the particular structural element is modulated to render a desired tonal value of the halftone image. The wider a section of the structural element is, the darker the represented tonal value appears.

In EP 0 710 574 A2 this type of halftone image representation is used as an authenticity feature for the purpose of copy protection of papers of value by having the spacing of the structural elements, that is, the spacing between their center lines, not be constant throughout the image but vary in accordance with a modulation function. This makes the spacing correspond at least in partial areas of the halftone image to the scanning grid of a copier or scanner used for duplicating the paper of value, causing a striking moiré pattern to arise in the corresponding partial area of the produced copy.

SUMMARY OF THE INVENTION

The problem of the present invention is to modify the line rasterization technique for halftone image representation to provide a further authenticity feature for documents of value that can be used as an alternative or in addition to known authenticity features.

This problem is solved by a data carrier with the features of the invention. Advantageous developments and embodiments of the invention are stated herein.

While, in the prior art, the screenlike lines of the halftone image are width-modulated with respect to their center line uniformly on both sides of the center line, the invention provides for only one-sided width modulation. The center line becomes a baseline. Thus, the width-modulated lines are smooth or flat on one side, the baseline, and width-modulated in accordance with the desired gray value on the other side. In the normal case, the one-sided width modulation will go in the same direction over the total length of a line. In exceptional cases, however, individual sections of the line can be width-modulated in opposite directions. This does not affect the tonal value produced, or strike the human eye if the spacing of the lines is selected close to the resolving power of the human eye.

The invention offers the special advantage that the special one-sided width modulation becomes recognizable to an unpracticed observer only upon extremely exact viewing under the magnifying glass. A potential forger will not readily notice this difference, and he will therefore use the standard rasterization technique for imitation, by which line width is modulated on both sides of a center line. However, should an imitator know or recognize the difference, he will not be readily able to realize one-sided width modulation, because this is not possible with standard software for graphic image processing.

In addition, it has turned out that a screen halftone image with one-sided width modulation permits higher contrast and more detailed rendition than a screen halftone image with double-sided width modulation. Conversion of the screen halftone image with one-sided width modulation is preferably done at a screen ruling of 30 to 60 lines per centimeter.

Halftone images according to the present invention refer not only to renditions of motifs with multistep tonal values, for example landscape or portrait renditions, but also to areas only rendering simple graphic structures and/or having few different tonal values.

Screen conversion with one-sided width modulation can be executed both in one color and in multicolor fashion, whereby multicolor execution of a motif is done by analogy with offset printing by overprinting individual printing plates with different inks. The primary colors, yellow, magenta, cyan and black, are preferably printed. Two-color conversions of a motif can likewise be done with the width-modulated screen. For example, a first screen can be printed with yellow and in a further pass a second screen with blue. After overprinting, the optical impression of a mixture of yellow and blue into the corresponding green tones arises at a suitable viewing distance.

In one-color conversion of a screen with one-sided width modulation, an angle of 45° to the horizontal is preferably used for aligning the screen lines. In multicolor conversions, the individual partial screens must be at an angle to each other, since disturbing patterns can otherwise occur. In three-color conversions, for example in the primary colors, magenta, cyan, yellow, an angle of 15°, 45° and 75° to the horizontal is preferably used for the screen lines in the individual colors.

The inventive rasterization technique with one-sided modulation can be used to achieve further advantageous security-related features, in particular effective copy protection.

For example, a preferred embodiment of the invention provides for the purpose of copy protection that adjacent structural elements are width-modulated in opposite directions so that pairs of structural elements adjoin each other with their smooth sides. If the distance between the smooth sides is selected so small as to be smaller than the scanning grid of a copier or scanner used for duplication, for example smaller than 100 microns, the corresponding adjoining structural elements will be imaged jointly as a single structural element in the copy.

A second preferred embodiment provides that the screen halftone image with one-sided width modulation is combined with a second screen halftone image preferably also having one-sided width modulation such that adjacent structural elements are associated alternately with the first halftone image and the second halftone image. Thus, the two halftone images are superimposed so that, in the most favorable case, neither one nor the other is recognizable under normal viewing conditions.

According to a first variant of said second embodiment, the two halftone images are printed in different colors. Then they can be distinguished by the use of a color filter that is colored in accordance with the color of the other halftone image.

According to a second variant of said second embodiment, adjacent structural elements of the two halftone images lie on adjacent flanks of a relief substrate. In this case the images can be the same color. Depending on the viewing angle, either only one or only the other halftone image is then visible, whereas the two images are superimposed when viewed from above. This phenomenon is also called the "tilt effect." The tilt effect disappears on a copy of the document of value. A detailed description of this security technology is found in WO 97/17211 with numerous examples, which are also realizable in connection with line screen halftone images with one-sided width modulation according to the present invention.

A third preferred embodiment provides that the halftone image is subdivided into partial areas that are readily detectable with the naked eye and differ in the spacing between their linear structural elements (screen frequency). This causes the structural elements to be mutually offset at the borders between the partial areas, which leads to striking moiré structures at least in some partial areas upon copying or scanning. This is explained in detail in WO 98/09825, and the examples described therein are also realizable in connection with line screen halftone images with one-sided width modulation according to the present invention.

According to a fourth preferred embodiment, the halftone image has integrated therein a further image or additional information that only becomes recognizable on a copy. This is obtained by causing the structural elements of the halftone image to be width-modulated on another side in the area of the image integrated therein compared to the area of the halftone image adjoining the integrated image. This difference does not recognizably affect the appearance of the original since it does not influence the tonal value and the spacing is in the fringe range of the resolving power of the human eye or therebelow. Upon copying, however, striking moiré patterns again arise at the places where the halftone image and the image hidden therein are adjacent.

Finally, a fifth special embodiment provides for using the halftone image as a bar code. This is possible because the structural elements, due to their one-sided width modulation, have a flat side that is easily and clearly identifiable. The smooth sides then define the beginning and/or end of a bar, while the distance between two consecutive smooth sides indicates the width or information content of the bar. A bar code readable in two directions is also realizable if adjacent structural elements are width-modulated alternately in one and the other direction.

The structural elements with only one-sided width modulation according to the invention can also be used in advantageous fashion to represent partial areas with constant tonal value or a continuous tonal value pattern, for example for the design of background areas or graphic areal design.

BRIEF DESCRIPTION OF THE DRAWINGS

All aforementioned embodiments of the invention can of course be combined at will. Further advantages and advantageous developments will result from the following description of special examples, performed with reference to the description of the figures, in which, specifically:

FIG. 5*a* shows a screen line with double-sided width modulation in a halftone image according to the prior art, FIG. 5*b* shows a screen line with one-sided width modulation in a halftone image according to the invention, FIGS. 6*a* to 6*f* show different embodiments of a screen line with one-sided width modulation according to FIG. 5*b*.

DETAILED DESCRIPTION OF THE INVENTION

Figure 1:
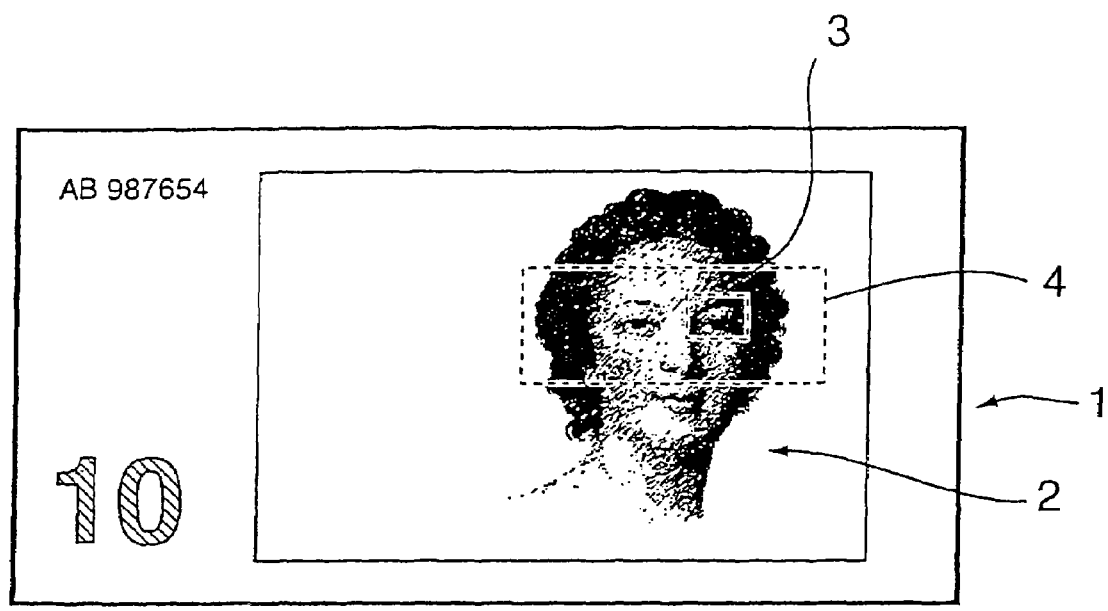
FIG. 1 shows a bank note in plan view.

FIG. 1 shows, as an example of one of the abovementioned documents of value, bank note 1 with printed halftone image 2, in this case a person. The two details 3 (eye) and 4 (face section) will be referred to hereinafter for further explanation of the invention.

Figure 2:
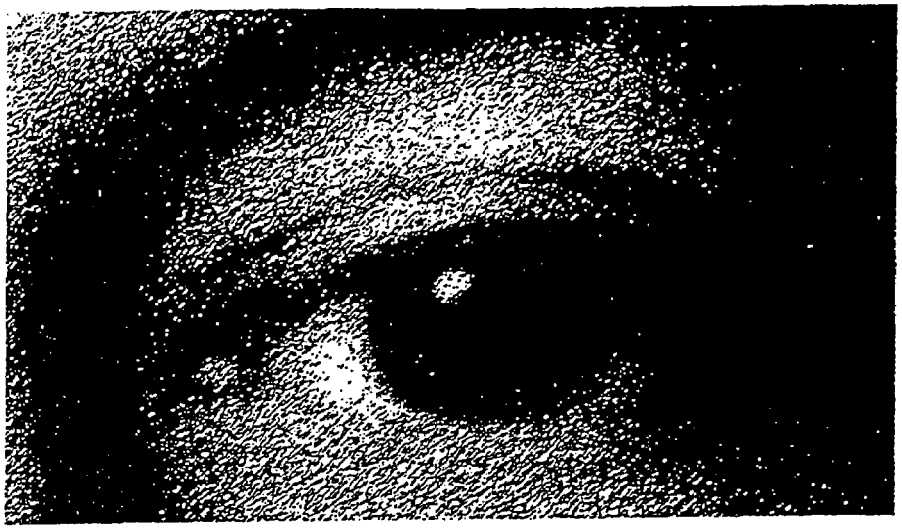
FIG. 2 shows a halftone original for detail 3 from FIG. 1.
Figure 3:
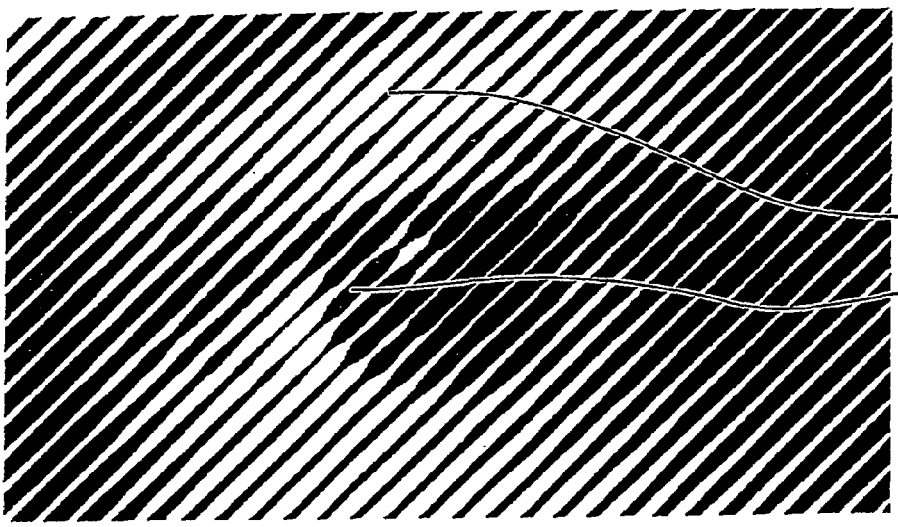
FIG. 3 shows a line screen halftone representation of the halftone original from FIG. 2 according to the prior art with double-sided width modulation.

FIG. 2 shows halftone original 3' on the basis of which detail 3 of halftone image 2 from FIG. 1 is to be converted into a line screen halftone image. FIG. 3 shows such a line screen representation 3" according to the prior art. In this case, each screen line 5 has a minimum thickness greater than zero. That is, white areas of the halftone image original are assigned a minimum gray value in the line screen conversion.

Gray values thereabove, that is, darker tonal values, such as the black pupil in the halftone original, are converted by corresponding modulation of the screen line width. It can be seen that screen lines 5 are width-modulated uniformly on both sides of a screen center line according to the prior art.

Figure 4:
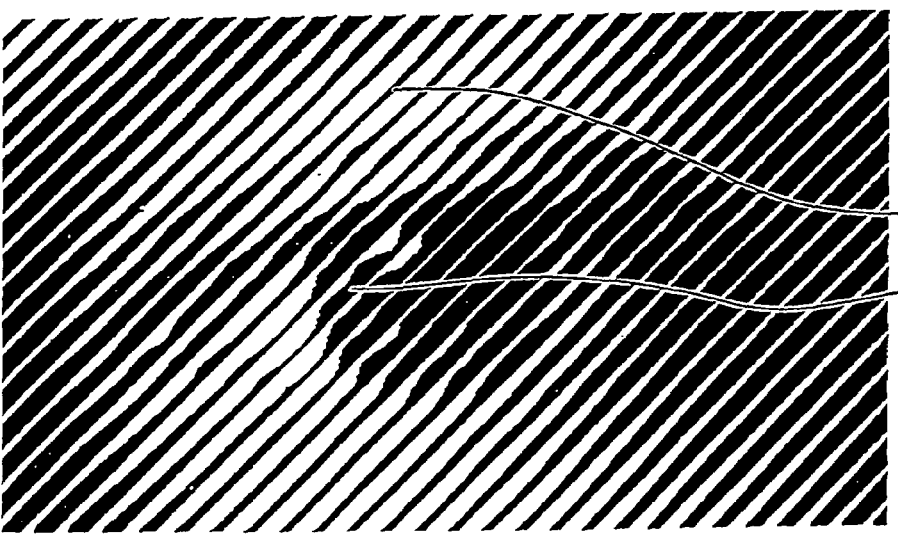
FIG. 4 shows a line screen halftone representation of the halftone original from FIG. 2 according to the invention with one-sided width modulation.

FIG. 4, on the other hand, shows a line screen halftone representation of the halftone original from FIG. 2 according to the present invention. Thus, width-modulated sections 6 are width-modulated only on one side of particular screen line 5, which in this example likewise has a minimum thickness which, however, might also be zero thickness. The width of screen lines 5 is identical in width-modulated sections 6 in FIGS. 3 and 4 so that the same halftone is realized altogether. This becomes clear when FIGS. 2 to 4, which each show an approximately tenfold enlargement of the original image, are viewed at a sufficient distance.

FIGS. 5a and 5b show this difference again schematically. One can see screen line 5 in each case, whereby width x of screen line 5 and width y of corresponding width-modulated section 6 are identical according to the prior art (FIG. 5a) and according to the present invention (FIG. 5b). Due to the only one-sided width modulation according to the invention, screen line 5 is smooth or flat on one side in FIG. 5b. This smooth side will be referred to hereinafter as "baseline" 7 of screen line 5. It can be roughly equated with the center line of screen line 5 in FIG. 5a according to the prior art.

FIGS. 6a to 6f show very diverse variants of modulation for the width of screen line 5 of section 6 with one-sided width modulation. The transition from one width of the screen line to another can be effected continuously (6c, 6f) or in predetermined gradations (6a, 6b, 6d). The step transitions can be abrupt (6d), ramp-shaped (6a, 6c), rounded (6b, 6f) or have mixed forms (6e).

Figures 7, 8:
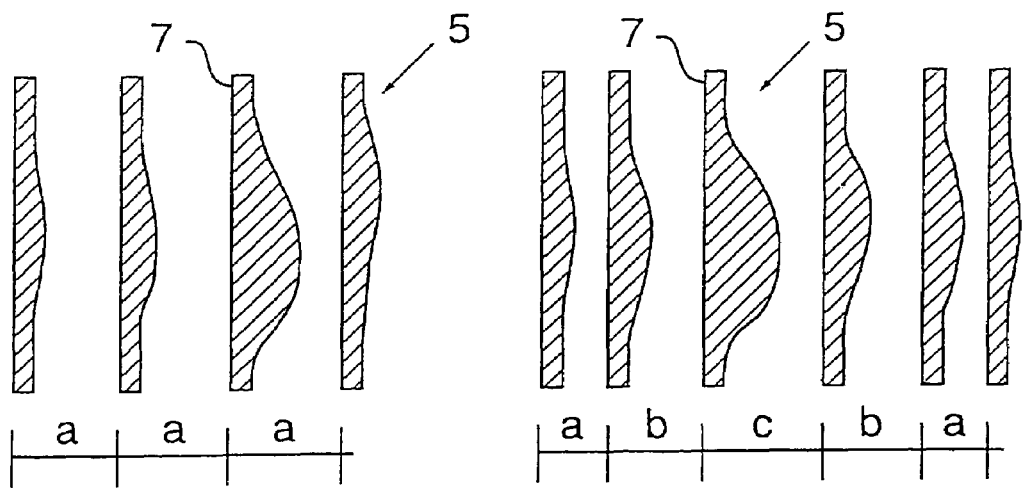
FIG. 7 shows screen lines with one-sided width modulation with equal spacing.
FIG. 8 shows screen lines with one-sided width modulation with different spacing.

FIGS. 7 to 12 show basic types of screen line arrangements with one-sided width modulation. FIG. 7 shows adjacent screen lines 5 with constant spacing a. That is, the distance between baselines 7 of screen lines 5 is constant throughout the halftone image in this embodiment. The spacing can also be variable, however, as shown in FIG. 8 by different spacings a, b, c. Preferably, spacing a, b, c varies between adjacent screen lines 5 in accordance with a continual function to avoid optical discontinuity in the appearance of the halftone image. In the example according to FIG. 8, the width of screen lines 5 should be accordingly greater for widely spaced screen lines than for closer spaced screen lines to produce the same tonal value that a halftone image with uniformly spaced screen lines would produce.

Figures 9, 10, 11:
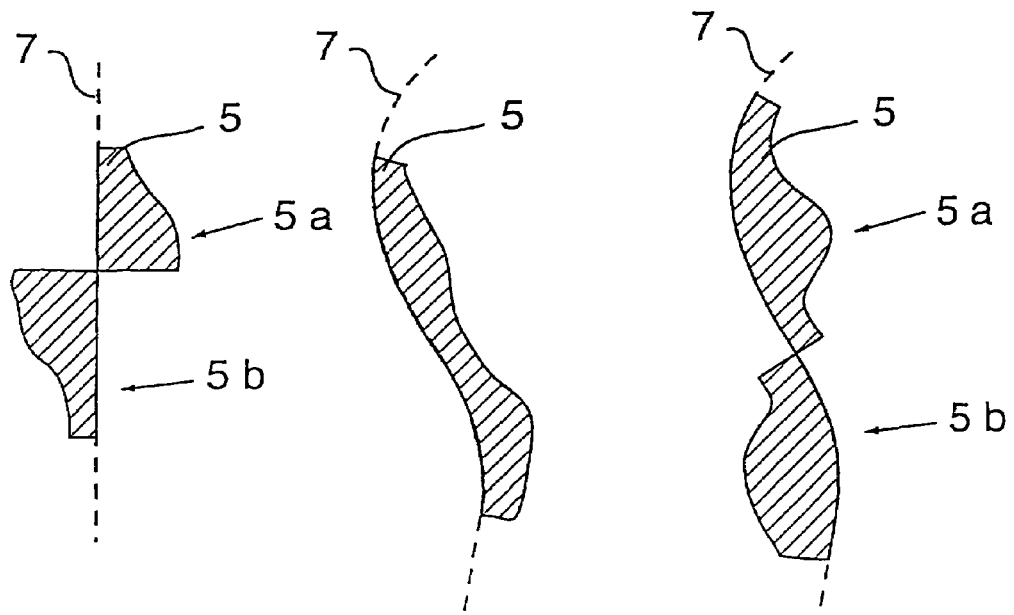
FIG. 9 shows a screen line with one-sided width modulation in different directions.
FIG. 10 shows a curved screen line with one-sided width modulation.
FIG. 11 shows a curved screen line with one-sided width modulation in different directions.

FIG. 9 shows a special embodiment of screen line 5 with one-sided width modulation. In this case, screen line 5 is subdivided into screen line sections 5a and 5b that are width-modulated on one side in opposite directions with respect to baseline 7. This has no influence on the represented tonal value and is visually all the less perceptible the smaller the spacing is selected.

Baseline 7 of screen line 5 need not necessarily be straight. It can also be sinuous or curved, this curvature being uniform unlike the opposite, width-modulated side of screen line 5, as shown in FIG. 10. In this variant the exceptional case according to FIG. 9 can of course also be realized, whereby individual screen line sections 5a, 5b are width-modulated in different directions with respect to baseline 7, as shown in FIG. 11.

Figure 12:
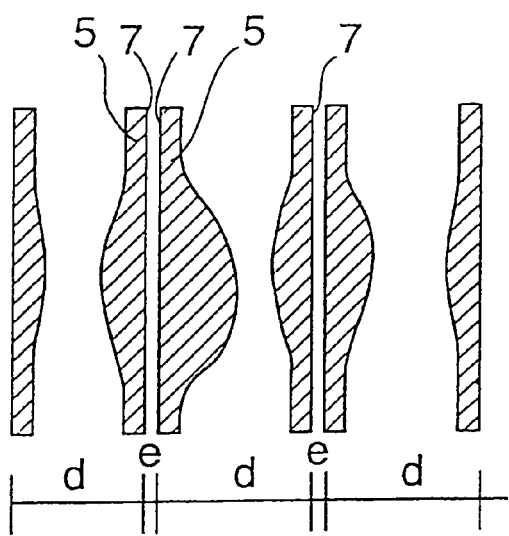
FIG. 12 shows adjacent screen lines with one-sided width modulation in opposite directions.

FIG. 12 shows a variant in which adjacent screen lines 5 with one-sided width modulation are width-modulated in opposite directions, so that pairs of consecutive screen lines 5 face each other with their flat sides or baselines 7. In the case of uniform rasterization, the spacing between baselines 7 of adjacent screen lines 5 changes alternately between distance d and smaller distance e. In this variant the spacings can of course also be selected to be variable, as explained with respect to FIG. 8, and baselines 7 can be curved, as explained with respect to FIG. 10.

Figure 13:
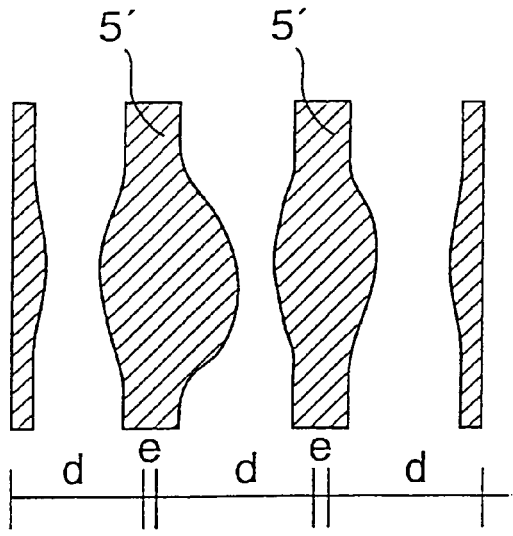
FIG. 13 shows the appearance of a copy of the screen lines from FIG. 12.

The variant according to FIG. 12 can be used especially advantageously for the purpose of copy protection when small distance e between screen lines 5 facing each other with baselines 7 is selected so small that they are not resolvable upon duplication with a copier or scanner whose scanning grid is above spacing e. On a copy the white areas located within distances e would then be lost and the two adjoining screen lines 5 rendered as common, wide screen line 5'. This changes the tonal value of the relevant area. This is shown in FIG. 13. Such a copying error would be both readily recognizable with a magnifying glass and striking to a layman since the human eye reacts relatively sensitively to tonal value deviations.

Figure 14:
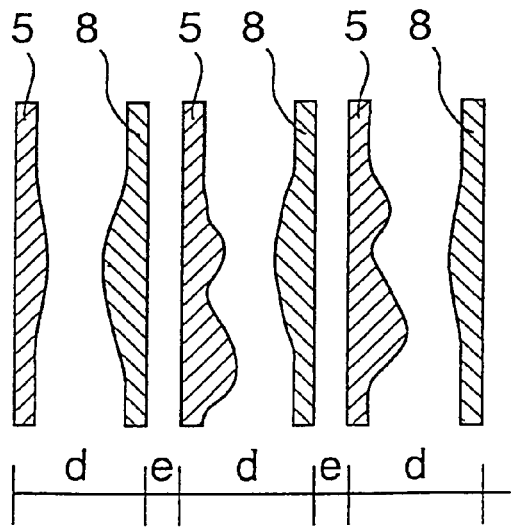
FIG. 14 shows screen lines of two superimposed halftone images with one-sided width modulation.

FIG. 14 shows schematically how the screen lines of two line screen halftone images can be disposed to represent two halftone images in superimposed fashion. The screen lines of the first halftone image are marked with reference no. 5 and the screen lines of the second halftone image with reference no. 8. Screen lines 5 and 8 of the two halftone images are disposed alternately side by side with predetermined spacing d, e. The spacing could also vary, however, as explained with respect to FIG. 8. Screen lines 8 of the second halftone image are, just like screen lines 5 of the first halftone image, screen lines with one-sided width modulation, whereby pairs of adjacent screen lines face each other with their flat baselines in accordance with FIG. 12. It is equally possible to form screen lines 8 of the second halftone image as conventional screen lines with double-sided width modulation or such that screen lines 8 of the second halftone image are width-modulated in the same direction as screen lines 5 of the first halftone image. Screen lines 5 and 8 can in the latter case again have equal or different spacing, in accordance with the representations of FIG. 7 or 8.

A superimposed representation of two halftone images, as explained with respect to FIG. 14, is not readily recognizable in plan view. To make the two superimposed halftone images visible, one embodiment of the invention provides for screen lines 5, 8 to be present in mutually distinguishable colors. Through a color filter colored in one of the two colors, the other halftone image can then be viewed.

Figure 15:
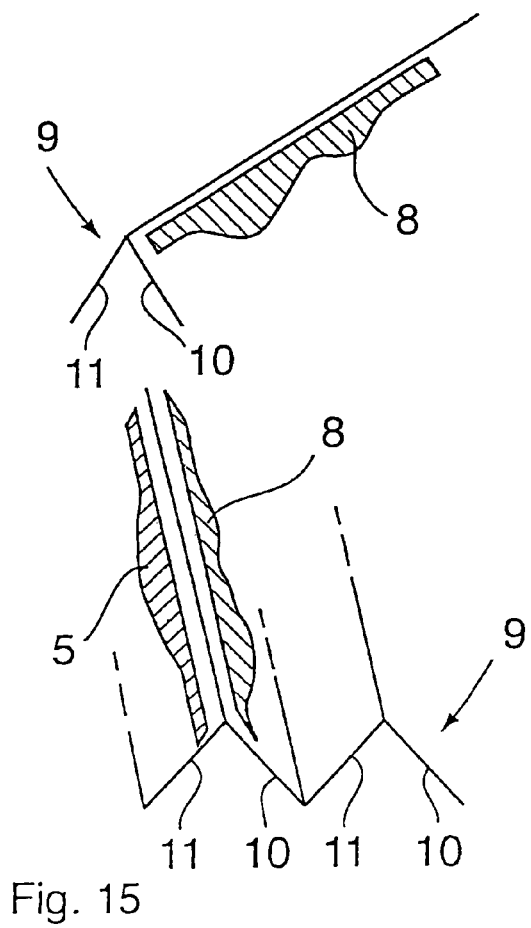
FIG. 15 shows the screen lines from FIG. 14 printed on adjacent flanks of a relief substrate.

According to another embodiment, screen lines 5 of the first halftone image and screen lines 8 of the second halftone image can be made visible separately from each other by being applied to adjacent flanks of a regular relief in the manner of a tilt image. Then either only the first or only the second or else both halftone images simultaneously are visible depending on the viewing angle. This is shown in FIG. 15 in two different perspective representations. Relief background 9 on whose parallel flanks 10, 11 screen lines 5, 8 are present is rendered only in a greatly enlarged small detail. The upper representation in FIG. 15 shows a perspective view from an angle of vision at which only screen elements 8 on flanks 10 are recognizable. Screen lines 5 of the first halftone image located on rearward flanks 11 are concealed by relief 9. The lower representation in FIG. 15, on the other hand, shows a perspective from an angle of vision at which both screen lines 8 of the second halftone image applied to flanks 10 and screen lines 5 of the first halftone images applied to rearward flanks 11 are in the field of view, so that the two halftone images are superimposed.

The first and second halftone images represented by screen lines 5 and 8 can be identical. In particular, the screen lines on two adjacent flanks 10, 11 can be mirror-inverted so that the same image becomes recognizable upon viewing from opposite angles of vision and the images are superimposed when viewed from above.

Figure 16:
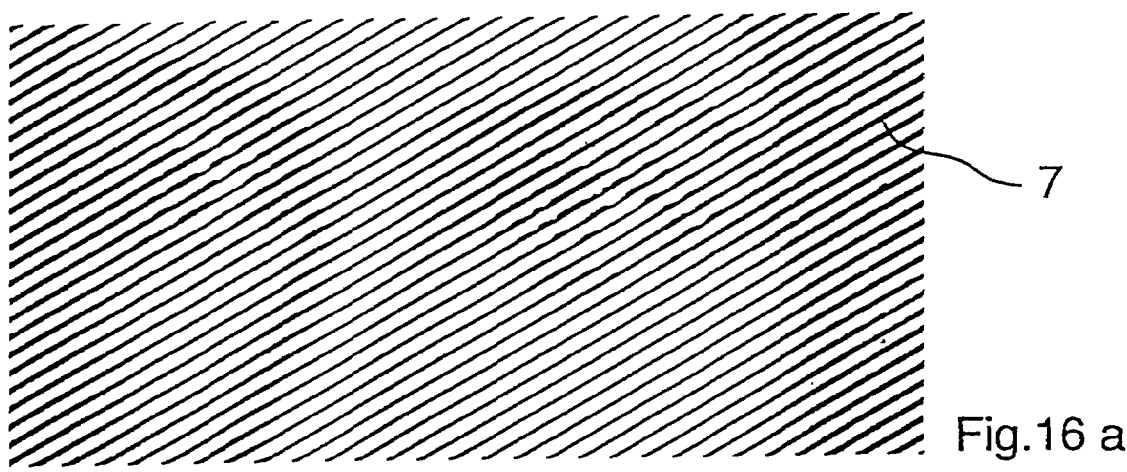
FIGS. 16*a* to 16*c* show two different line screen halftone images with one-sided width modulation, separately and in superimposed representation in accordance with FIG. 14, FIGS. 17*a*, 17*b* show variants of the arrangement of the screen lines of two superimposed line screen halftone images with one-sided width modulation.
Figure 16:
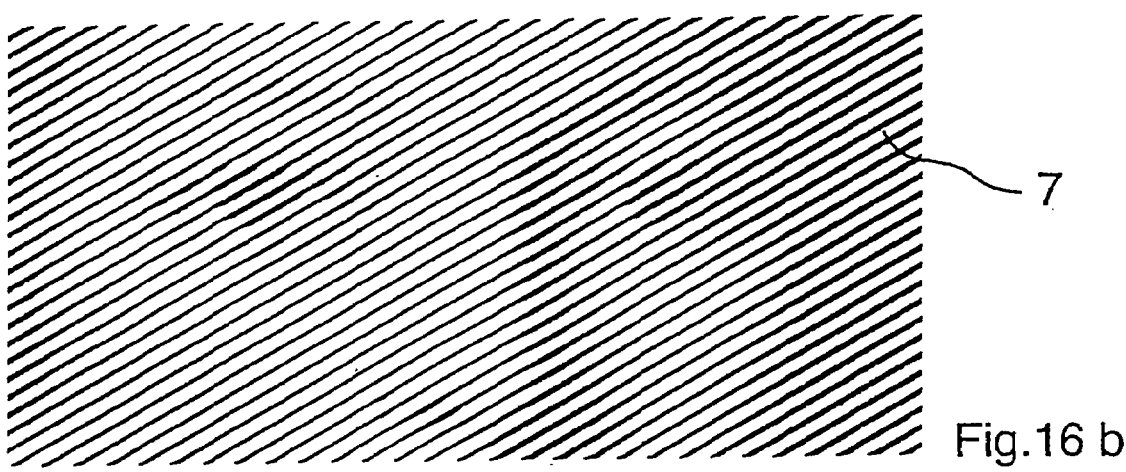
Figure 16:
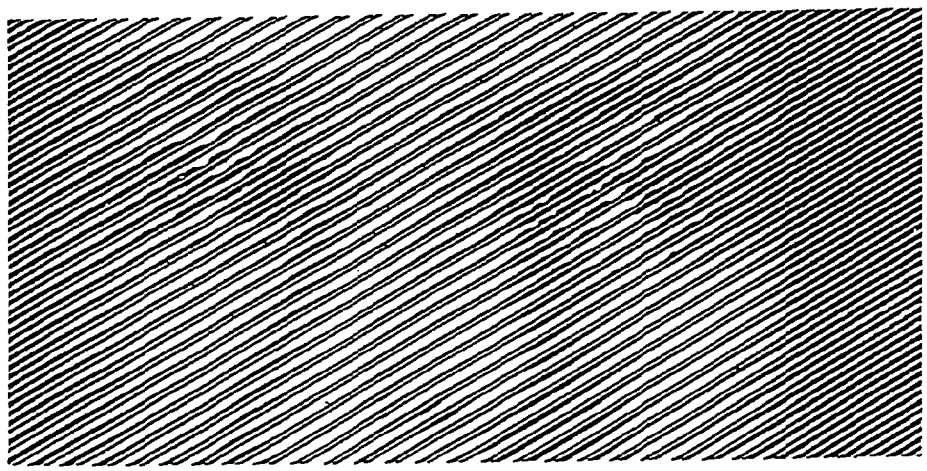

On the other hand, it is also possible to superimpose two completely different halftone images. This is shown by way of example by picture detail 4 (FIG. 1) in FIGS. 16*a* to 16*c*. FIG. 16*a* shows the representation of the face section of a woman as a line screen halftone image, and FIG. 16*b* shows a corresponding face section of a man likewise as a line screen halftone image. The spacing of the screen lines is identical in both halftone representations, and the screen lines are inclined by the same angle and extend in the same direction. The screen lines of both halftone representations are width-modulated on one side with respect to their particular baselines 7, but in opposite directions.

In FIG. 16*c* the two halftone representations of FIGS. 16*a* and 16*b* are superimposed, a small distance of for example 50 microns being adjusted between adjoining flat baselines 7 of adjacent screen lines. Such exact printing is possible in the offset method. The distance is adjusted to be so small as to be smaller than a scanning grid of conventional copiers or scanners. This means, as explained above with respect to FIGS. 12 and 13, that the small distance is lost upon copying so that the copy is easily distinguishable from an original using a magnifying glass.

Figure 17:
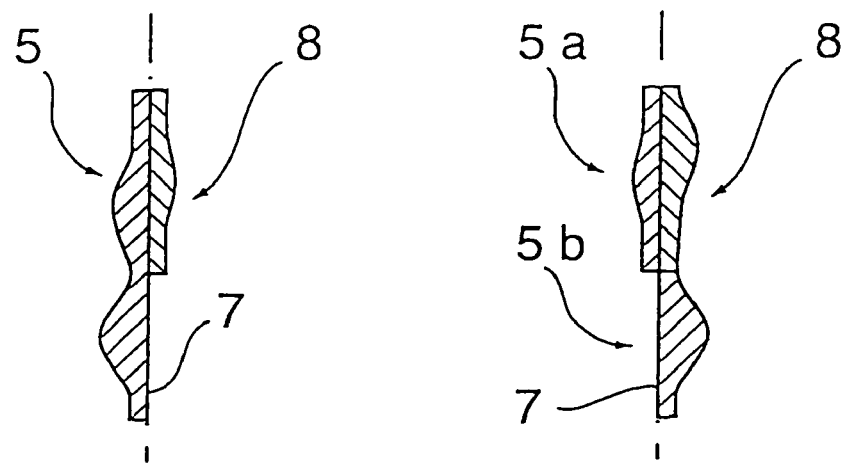

Screen lines 5 and 8 of the two halftone images need of course not necessarily be spaced apart in accordance with FIG. 14. They can also be immediately adjacent with their flat baselines 7, as shown in FIGS. 17*a* and 17*b*.

Figure 18:
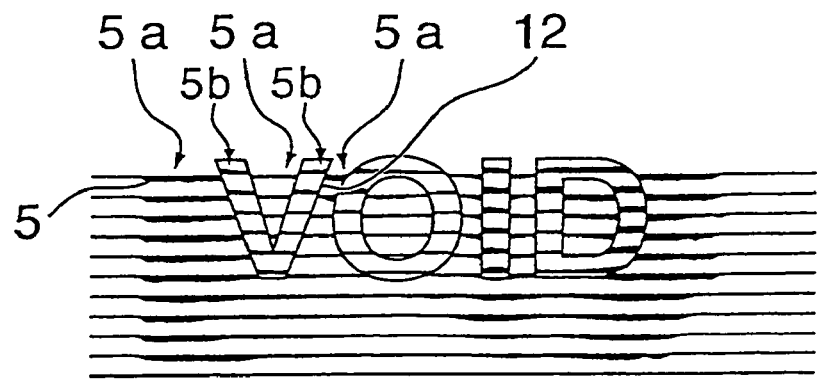
FIGS. 18*a*, 18*b* show an image integrated in a line screen halftone image with one-sided width modulation.
Figure 18:
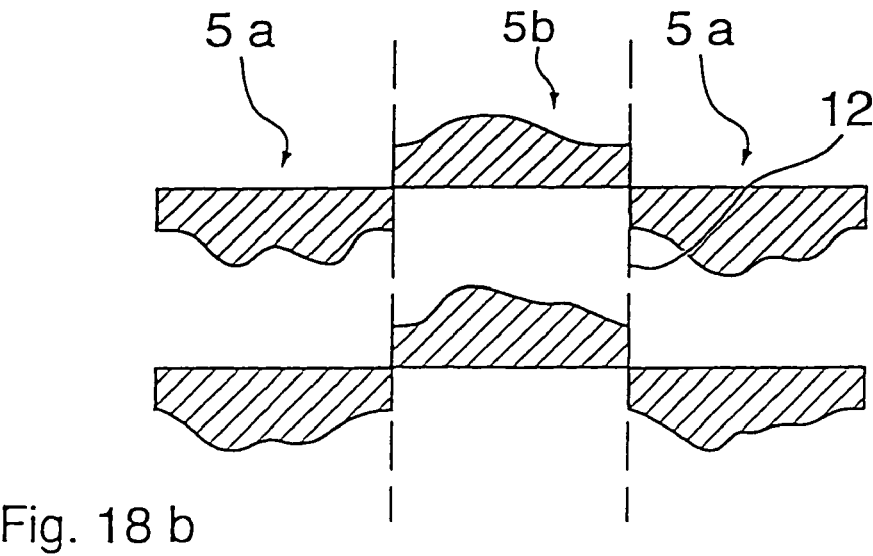

One-sided width modulation of screen lines opens up a further advantageous possibility of copy protection, which is explained with reference to FIGS. 18*a* and 18*b*. FIG. 18*a* again shows a detail from a line screen halftone image, whereby only a few screen lines are shown greatly enlarged by way of example. Screen line 5 and the adjacent screen lines are subdivided into screen line sections 5*a* and 5*b* with opposite, one-sided width modulation, as explained fundamentally above with reference to FIG. 9. Screen line sections 5*b* with an opposite direction of width modulation compared to screen line sections 5*a* are present only in contour 12. Contour 12 is shown in FIG. 18*a* as a contour line to optically emphasize the area. In corresponding realizations the contour line is usually left out. Contour 12 defines an image or information in the actual halftone image that does not emerge optically from the halftone image, since the tonal value is not influenced by the direction in which the width of the screen line is modulated, and since the screen line distances are selected so small that they are not, or in any case not readily, recognizable with the naked eye. In FIG. 18*b* two adjacent screen lines of the halftone image detail from FIG. 18*a* are shown again greatly enlarged. It can be seen that screen line sections 5*a* and 5*b* adjoin each other only at one corner. This exact adjoining is not exactly reproduced on a copy due to the limited resolving power of copiers and scanners. Instead, a copy shows moiré patterns in these bordering areas that make contour 12 striking to the naked eye. That is, the viewer of a copy will see the word "VOID" in the shown example and thus recognize that the copy is an invalid document of value.

Figure 19:
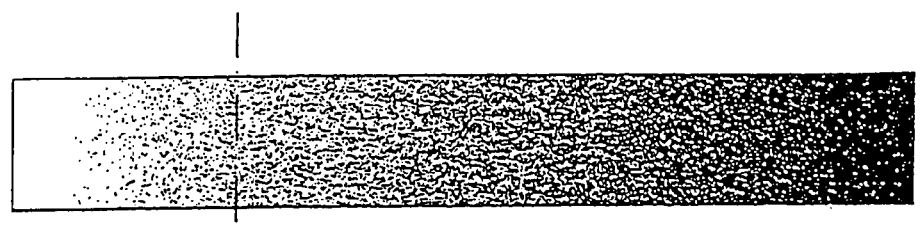
FIGS. 19*a*, 19*b* show a variant of width modulation of screen lines for representing tonal values below a predetermined limiting value.
Figure 19:
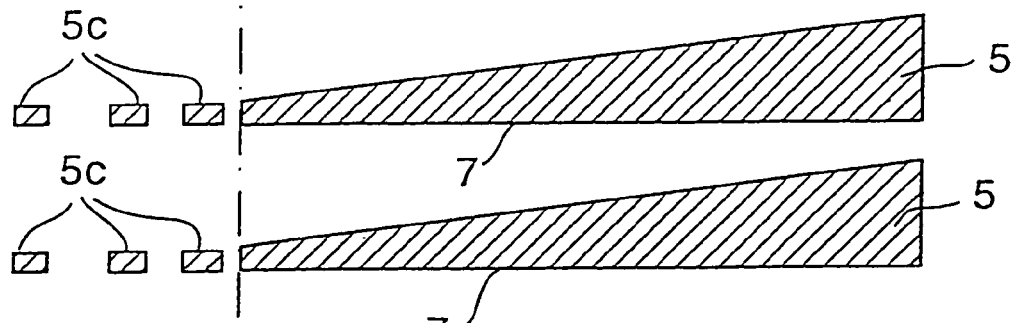

FIGS. 19*a* and 19*b* show a variant of how tonal values that are below a predetermined gray value can be converted into a screen line. FIG. 19*a* shows a gray wedge that renders all gray values decreasing from dark to light from the right to the left. FIG. 19*b* shows by way of example two adjacent screen lines 5 whose width decreases in a wedge shape in accordance with the decreasing gray value from the right to the left. As of a certain gray value, gray values therebelow are no longer rendered by a narrowing screen line but by spaced-apart screen line sections 5*c*, the distances between screen line sections 5*c* increasing as the gray value further decreases, and/or the length of screen line sections 5*c* decreasing as the gray value further decreases. This kind of tonal value conversion can render a relatively large tonal value range.

Figure 20:
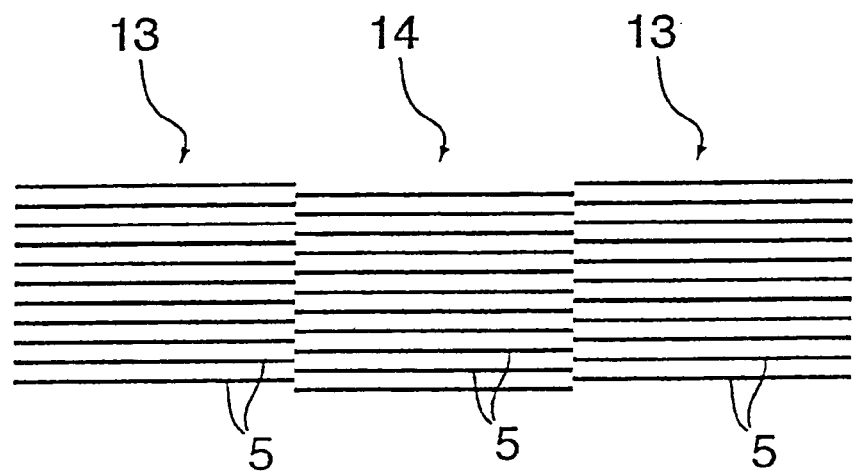
FIG. 20 shows a halftone image subdivided into partial areas with mutually offset rasterization.
Figure 21:
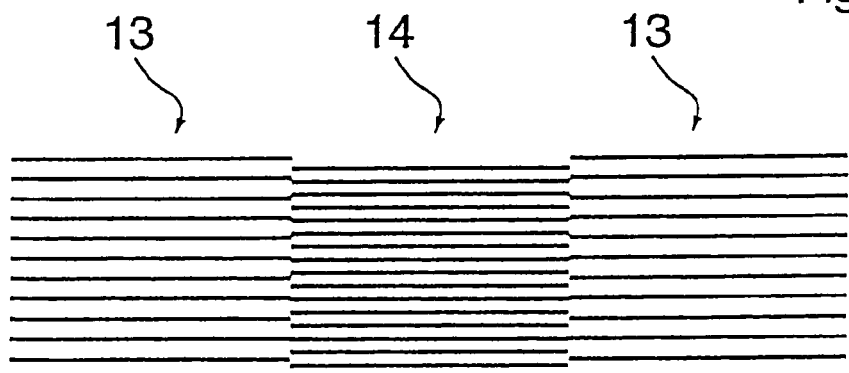
FIG. 21 shows a halftone image subdivided into partial areas with different spacing.

FIGS. 20 and 21 show a further possibility of copy protection that is based on the same principle as the copy protection explained with respect to FIGS. 18*a*, 18*b*. Both figures show details from a halftone image whose screen lines 5 are width-modulated on one side. The modulation of the width is not rendered in FIGS. 20 and 21, however. The halftone image detail shown is subdivided into partial areas 13 and 14.

Partial areas 13 and 14 in FIG. 20 differ from each other in that their screen lines 5 are mutually offset at equal spacing. Partial areas 13, 14 in FIG. 21 differ from each other in that their screen lines 5 have different spacing. In both cases it is ensured that the bordering areas between partial areas 13 and 14 show copying errors when copied, which are again due to the fact that copiers and scanners work with a defined scanning grid. On the copy, easily recognizable moiré patterns therefore appear in the bordering area between partial areas 13, 14.

Finally, it is possible to utilize the screen lines with one-sided width modulation in a halftone image as a bar code. This will be explained hereinafter by the example of FIG. 8. Each baseline 7 defines the beginning of a bar (or the end of a bar) and distance a, b, c, etc., between baseline 7 of screen line 5 and baseline 7 of adjacent screen line 5 stands for information content, that is, the width of the bar. The reading direction is either from the left to the right or from the right to the left.

It is also possible to produce a bar code readable in both directions if screen lines 5 are disposed in the way shown in FIG. 12, so that two adjacent screen lines 5 adjoin each other with their flat sides 7. In this case, distance e is to be selected so great that baselines 7 are reliably detectable. The width of a bar is then defined via distance d, which is variably adjustable in accordance with the description of FIG. 8. Distance e, which is preferably constant, serves as the separating line between the thus defined bars.

Figure 22:
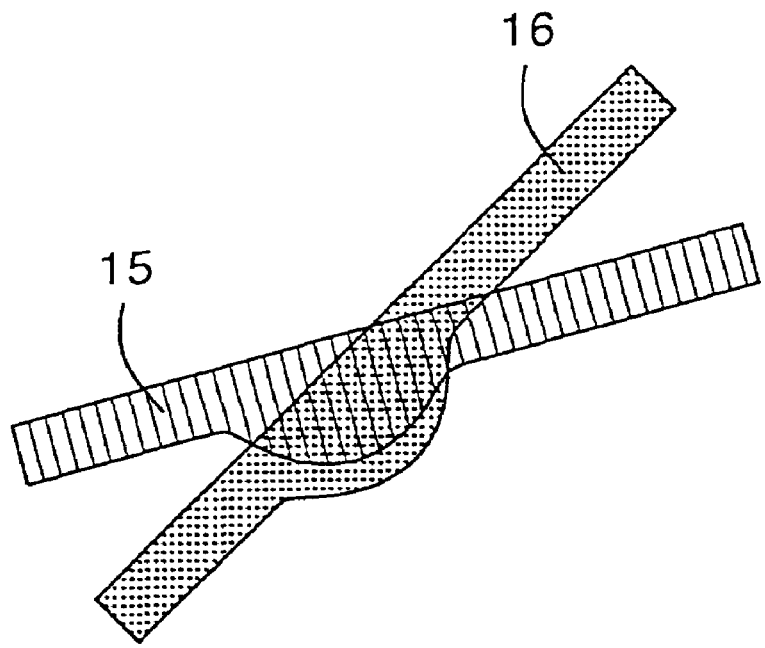
FIGS. 22*a*, 22*b* show enlarged details of a multicolor screen conversion.
Figure 22:
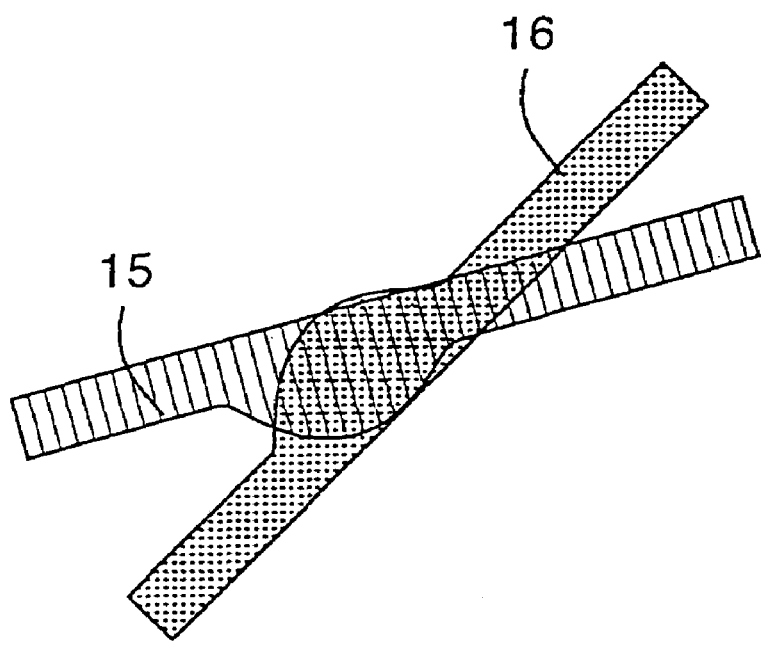

FIGS. 22*a* and 22*b* show the principle for a two-color conversion by way of example for a multicolor representation of a motif. The figures show, greatly enlarged, an intersection point of two differently aligned lines 15, 16. The total image is formed by two groups of screen lines extending parallel to screen lines 15 and 16. The desired mixed colors or secondary colors arise in the area where the two screen lines 15 and 16 executed in different colors overlap. Because of the only one-sided width modulation according to the invention, the alignment of the modulation can vary for differently colored lines 15, 16. In a three-color screen conversion, the screen lines of three differently aligned and differently colored line screens intersect in corresponding fashion.

The invention claimed is:

1. A data carrier, having at least a first line screen halftone image represented by spaced, linear structural elements, a desired tonal value of the line screen halftone image being realized by suitable modulation of the width (y) of the linear structural elements, and the linear structural elements each comprising a baseline with respect to which the width (y) is modulated, wherein at least in a detail of the line screen halftone image, the width (y) of the linear structural elements is modulated at each place only on one side of the particular baseline so that the linear structural elements are flat on one side and width-modulated on one side.

2. A data carrier according to claim 1, further comprising a second line screen halftone image represented by spaced, width-modulated, linear structural elements that are disposed adjacent to the structural elements of the first line screen halftone image such that adjacent structural elements are associated alternately with the first line screen halftone image and the second line screen halftone image.

3. A data carrier according to claim 2, wherein the second line screen halftone image has the features of the first line screen halftone image.

4. A data carrier according to claim 2, wherein adjacent structural elements have mutually contrasting colors.

5. A data carrier according to claim 2, wherein adjacent structural elements are present on adjacent flanks of a relief substrate material.

6. A data carrier according to claim 5, wherein the first line screen halftone image and the second line screen halftone image are identical.

7. A data carrier according to claim 5, wherein the first line screen halftone image and the second line screen halftone image are different.

8. A data carrier according to claim 1, wherein the line screen halftone image has two or more groups of linear structural elements, the structural elements of the same group having the same color and alignment, while the structural elements of different groups have different colors and are differently aligned.

9. A data carrier according to claim 8, wherein the line screen halftone image has groups of structural elements having the colors, cyan, magenta and yellow, in each case.

10. A data carrier according to claim 8, wherein the line screen halftone image has three groups of structural elements forming an angle of 15°, 45° and 75° to the horizontal in each case.

11. A data carrier according to claim 1, wherein the first line screen halftone image has integrated therein an image not perceptible to the eye and having a predetermined contour, by the linear structural elements of the first line screen halftone image being width-modulated on another side of their particular baseline within the contour than in an area of the first line screen halftone image surrounding the contour.

12. A data carrier according to claim 1, wherein adjacent structural elements are width-modulated in opposite directions with respect to their particular baseline.

13. A data carrier according to claim 12, wherein the distances (d, e) between the baselines of adjacent structural elements are small where the structural elements are adjacent with their flat sides, while being great where the structural elements are adjacent with their width-modulated sides.

14. A data carrier according to claim 13, wherein the small distances (e) are smaller than 150 microns.

15. A data carrier according to claim 1, wherein the linear structural elements are disposed mutually offset in at least two adjacent partial areas of the first line screen halftone image.

16. A data carrier according to claim 15, wherein the distances (a; a, b, c) between the baselines of adjacent structural elements are different in the two adjacent partial areas.

17. A data carrier according to claim 1, wherein the distances (a, b, c) between the baselines are different at least within a partial area of the first line screen halftone image.

18. A data carrier according to claim 17, wherein the partial area with differently spaced baselines forms at least one bar code formed by the linear structural elements, the smooth sides of the structural elements indicating at least one of a beginning or an end of a bar, and the distance (a, b, c; d) between the smooth sides of the structural elements indicating the information to be associated with a bar.

19. A data carrier according to claim 12, wherein the partial area with differently spaced baselines forms at least one bar code formed by the linear structural elements, the smooth sides of the structural elements indicating at least one of a beginning or an end of a bar, and the distance (a, b, c; d) between the smooth sides of the structural elements indicating the information to be associated with a bar; and wherein the opposite smooth sides of adjacent structural elements form a separating line between two adjacent bars, so that the structural elements, width-modulated in opposite directions, form bars of a bar code readable in opposite directions.

20. A data carrier according to claim 1, wherein the baselines are curved.

21. A data carrier according to claim 1, wherein the structural elements have a density of 30 to 60 per centimeter.

22. A data carrier according to claim 1, wherein a tonal value below a predetermined limiting value is represented by linear structural elements comprising spaced-apart structural element sections.

23. A data carrier according to claim 1, wherein the first line screen halftone image represents a logo, writing or pictorial representation.

24. A data carrier according to claim 1 in the form of a document of value, selected from the following group of documents of value: bank note, check, share, identification document, admission ticket, travel ticket, certificate, credit card, check card.

* * * * *